(12) United States Patent
Bieler (10) Patent No.: US 8,602,470 B2
(45) Date of Patent: Dec. 10, 2013

(54) GRIPPER CLAW WITH REPLACEABLE GRIPPER FINGERS

(75) Inventor: Tino Bieler, Bassersdorf (CH)

(73) Assignee: Tecan Trading AG, Mannedorf (CH)

( * ) Notice: Subject to any disclaimer, the term of this patent is extended or adjusted under 35 U.S.C. 154(b) by 0 days.

(21) Appl. No.: 13/549,970

(22) Filed: Jul. 16, 2012

(65) Prior Publication Data

US 2013/0020820 A1    Jan. 24, 2013

(30) Foreign Application Priority Data

Jul. 21, 2011    (CH) ........................................ 1218/11

(51) Int. Cl.
*B66C 1/42* (2006.01)

(52) U.S. Cl.
USPC ........................................ 294/119.1; 294/207

(58) Field of Classification Search
USPC ................ 294/119.1, 207, 103.1, 116, 67.33, 294/81.54; 901/31, 37–39; 414/735, 591, 414/749.1, 753.1, 590, 751.1, 744.1
See application file for complete search history.

(56) References Cited

U.S. PATENT DOCUMENTS

| | | | |
|---|---|---|---|
| 4,759,686 A | 7/1988 | Kirst | |
| 4,993,132 A | 2/1991 | Manz | |
| 4,995,493 A | 2/1991 | Cotsman et al. | |
| 5,163,729 A | 11/1992 | Borcea | |
| 5,256,128 A | 10/1993 | Neumann | |
| 5,360,249 A | 11/1994 | Monforte et al. | |
| 5,997,064 A * | 12/1999 | Orita | 294/119.1 |
| 6,199,928 B1 | 3/2001 | Bilsing | |
| 6,394,521 B1 * | 5/2002 | Bertini | 294/207 |
| 6,523,875 B1 * | 2/2003 | Ostholt | 294/207 |
| 7,044,706 B2 * | 5/2006 | Jung | 414/737 |
| 7,322,623 B2 * | 1/2008 | Morton | 294/119.1 |

FOREIGN PATENT DOCUMENTS

| | | |
|---|---|---|
| DE | 3513893 A1 | 10/1986 |
| DE | 3705884 A1 | 9/1988 |
| DE | 3715140 A1 | 11/1988 |
| EP | 0022331 B1 | 1/1981 |
| EP | 0993916 B1 | 4/2000 |
| GB | 2130550 A | 6/1984 |
| JP | 2007136587 | 6/2007 |
| WO | WO 2008/009828 A2 | 1/2008 |

* cited by examiner

*Primary Examiner* — Stephen Vu (74) *Attorney, Agent, or Firm* — Notaro, Michalos & Zaccaria P.C.

(57) ABSTRACT

A gripper claw has replaceable gripper fingers and two gripper jaws each with a first jaw flange. The jaws are fastened to respective jaw flanges and are movable on linear guides, toward and away from one another. Each jaw has a holding mandrel, with holding cone. Each finger is reversibly insertable into one gripper jaw and has a finger base with depression complementary to a respective cone. The cone has a length that is at least one-third of its largest diameter, and its smallest diameter is at most 90% of the largest cone diameter. The jaws and the bases form a holding mechanism which holds the fingers in a stop position on a respective gripper jaw and they form a stabilizing mechanism that, with the holding cone, prevent tilting of the fingers.

29 Claims, 6 Drawing Sheets

GRIPPER CLAW WITH REPLACEABLE GRIPPER FINGERS

RELATED PATENT APPLICATIONS

This patent application claims priority of the Swiss Patent Application No. 01218/11 filed on Jul. 21, 2011, the entire disclosure thereof is herein incorporated by explicit reference for any purpose.

TECHNICAL FIELD OF THE INVENTION

The invention relates to a gripper claw with gripper fingers insertable reversibly therein for grasping and depositing objects. In addition, the invention relates to a robot and methods for the robotic receiving and releasing of gripper fingers using such a gripper claw. Such gripper claws typically comprise two gripper jaws which carry the gripper fingers, and which are fastened so that they are movable on linear guides and are designed as movable toward one another and away from one another. The two gripper fingers attached thereon can thus also be moved exactly toward one another or away from one another, so that objects can be received and deposited again in a targeted manner. Such grippers are referred to as parallel grippers.

RELATED PRIOR ART

Parallel grippers for gripping workpieces are well known from the prior art. Thus, EP 0 022 331 B1 discloses a parallel gripper whose gripper fingers are each fastened on one strand of an endless toothed belt tensioned over two deflection gear wheels. In one rotational direction of the deflection gear wheels, the two gripper fingers move synchronously toward one another, in the other rotational direction they also move synchronously away from one another. The gripper fingers always move mirror-symmetrically in relation to a central axis between and in the same direction as the rotational axes of the two deflection gear wheels. These parallel gripper fingers are driven using a hydraulic drive, which is controlled via two valves. The gripper fingers are therefore designed as movable toward one another and away from one another by means of a common toothed belt driven by a motor drive.

Parallel grippers are also known from a European patent of the current applicant (cf. EP 0 993 916 B1: FIGS. 5 and 6 or FIGS. 7 and 8), whose grippers comprise a gripper housing and a claw housing. Cross sections through this claw housing are reproduced in the current patent application in FIGS. 10 and 11. In order to avoid confusions with the reference signs of the present patent application, the reference signs used in EP 0 993 916 B1 are shown in italics hereafter and the reference signs used for the same components here are shown in standard form: According to EP 0 993 916 B1, two gripper fingers (40a,40b=56,56') are mounted so they are movable in a claw housing (17=51), the gripper fingers being operationally linked via a gripper bolt (37=53) which is coaxial to a rotational axis (36=52), to a positioning shaft in such a manner that rotations of this positioning shaft are converted into gripper movements of the two gripper fingers (40a,40b=56, 56'). These gripper fingers (40a,40b=56,56') are fastened on two slides (39a,39b=55,55') mounted so they are displaceable in the claw housing (17=51) and are operationally linked with the gripper bolt (37=53) in such a manner that rotations of the gripper bolt (37=53), which carries at least one gear wheel (38a,38b=54,54') arranged between the slides (39a,39b=55, 55'), are converted into corresponding displacements of the slides (39a,39b=55,55') directed toward one another.

According to a first disclosed variant (cf. EP 0 993 916 B1: FIG. 6=FIG. 10), a first toothed belt (42a=58) originating from the front end of one flank (41a=57) of the first slide (39a=55) runs via the at least one gear wheel (38a,38b=54, 54') to a rear end of a flank (41b=57') of the second slide (39b=55') and—in the reverse rotational direction in relation to the rotational axis (36=52)—a second toothed belt (42b=58') originating from the front end of the flank (41b=57') of the second slide (39b=55') runs to a rear end of the flank (41a=57) of the first slide (39a=55).

According to a second disclosed variant having a similar mode of operation (cf. EP 0 993 916 B1: FIG. 8=FIG. 11) the slides (39a,39b=55,55') each carry toothed racks (52a, 52b=59,59') provided with gear teeth, with which the at least one gear wheel (38a,38b=54,54') directly engages.

Parallel grippers from Schunk GmbH & Co KG (D-74348 Lauffen/Neckar, Germany) are constructed similarly having their belt drive and the linear guide used, but have a variable electric drive. The parallel gripper having the brushless servo motor used, whose gripping force can be reduced to approximately 1 to 2 N, is also suitable in particular for the laboratory field, where a very low gripping force is often required.

Robot grippers having replaceable tools are known from the machine industry. Thus, for example, U.S. Pat. No. 6,199, 928 B1 discloses a coupler activatable by a motor for connecting a workpiece gripper to a manipulating device. The entire gripping device is always replaced here and not only the gripper fingers. This is also true for document U.S. Pat. No. 5,163,729, which discloses a parallel gripper that is driven by a toothed rack or pneumatically driven, but whose gripper fingers are screwed on. Documents U.S. Pat. No. 4,759,686, U.S. Pat. No. 4,993,132, and U.S. Pat. No. 4,995,493 disclose replaceable grippers or tools, which are fastened on the robot by means of a snap mechanism, by means of a central threaded spindle, or by means of magnetic force. Document U.S. Pat. No. 4,995,493 discloses the use of a tool having a conical holding mandrel, whose front face is magnetically held on the robot until an excessively large lateral force acts on the tool, which detaches the tool from the holding mandrel and disconnects it from the robot without damage.

Parallel grippers known from the prior art are normally distinguished in that their gripper fingers can only be removed or replaced by means of the use of tools. Accordingly, in the case of traditional parallel grippers, the gripper fingers cannot be replaced without intervention of a technician. In particular for the use of high-throughput working platforms, which are used, for example, in biochemical or bio-logical-medical laboratories (e.g., of the type Freedom EVO® from Tecan Trading AG, CH-8708 Mannedorf, Switzerland), parallel grippers which have replaceable gripper fingers and could thus be used in even more manifold ways would be desirable.

Documents DE 35 13 893 A1 and JP 2007 136 587, which both disclose replaceable gripper fingers, form an exception. DE 35 13 893 A1 discloses jaws or holders displaceable relative to one another, which are guided in a carriage guide of a gripper for workpieces and are displaceable in a long stroke by means of a motor-driven traction spindle, the holders being provided with a quick-change coupling for the finger elements. The finger elements are replaceable fully automatically thanks to the disclosed plug-in coupling, in that they have a coupling shaft which engages in a twist-locked manner in the respective jaw or holder. In document JP 2007 136 587, the gripper fingers are held clamped between two leaf springs arranged on jaws or holders; if the gripper fingers are tilted toward the space between the jaws, they detach from the leaf springs and can be removed. While the embodiment disclosed in JP 2007 136 587 is not suitable for robotically receiving, releasing, and replacing the gripper fingers, DE 35 13 893 A1 provides just such a solution.

A gripper finger replacement mechanism for small robots is known from U.S. Pat. No. 5,256,128. Such robots are usable above all in laboratories, in which vessels whose content is hazardous are sometimes worked with (infection hazard, corrosive or toxic contents, hazard of the transfer of pathogens to other containers) or can become hazardous through specific reactions. In accordance with the respective safety precautions, different vessels are often used, so that the laboratory robot must be capable of securely gripping and transporting these different vessels, e.g., test tubes, microplates, or microtubes. In accordance with the method sequences and the respective containers used, robot grippers equipped with different gripper fingers are alternately used, so that the gripper fingers are to be replaced automatically, i.e., robotically and with the least possible application of force. U.S. Pat. No. 5,256,128 discloses one or more gripper finger mounts, which present the robot arm with a pair of specially dimensioned and equipped gripper fingers having their individual changing plates. This robot arm comprises two gripper jaws each having an integrated coupling mechanism. By lowering the gripper jaws onto the changing plates of the provided gripper fingers and by moving together the jaws and therefore the changing plates with the gripper fingers, the coupling mechanism is actuated and therefore the changing plates are coupled to the gripper jaws.

Parallel grippers having replaceable gripper fingers are also known from documents GB 2 130 550 A, DE 37 15 140 A1, and U.S. Pat. No. 5,360,249. These gripper fingers are securely connected by means of a locking mechanism to the respective gripper jaws, the locking mechanism respectively being designed as a sliding rod arranged on the gripper jaws (cf. GB 2 130 550 A), sliding carriages (cf. DE 37 15 140 A1) or as a snap lever pair (cf. U.S. Pat. No. 5,360,249).

A simpler embodiment of a parallel gripper having replaceable gripper fingers is known from DE 37 05 884 A1. To receive gripper fingers (referred to in DE 37 05 884 A1 as "gripper jaws") from a gripper finger magazine, the gripper jaws (referred to in DE 37 05 884 A1 as "gripper fingers") are moved linearly toward one another. Each gripper finger to be received respectively has multiple centering pins, which engage in a formfitting manner in corresponding recesses of the movable gripper jaws. The gripper fingers are then held on the gripper jaws by means of an electromagnet.

OBJECTS AND SUMMARY OF THE PRESENT INVENTION

The object of the present invention is to provide alternative embodiments of gripper claws having replaceable gripper fingers for grasping and depositing objects, which are preferably suitable for use in robotic laboratory facilities.

This object is achieved according to a first aspect in that a gripper claw having replaceable gripper fingers for grasping and depositing objects as herein disclosed is proposed. This gripper claw comprises two gripper jaws, which each comprise a first jaw flange parallel to a first axis, these two gripper jaws being movably fastened using their respective first jaw flange on at least one linear guide and being implemented as movable toward one another and away from one another in the direction of the first axis along this at least one linear guide by means of at least one drive.

The gripper claw/gripper finger combination according to the invention is characterized in that each of the two gripper jaws comprises a holding mandrel having a holding cone and having a holding axis, each of the two gripper fingers being implemented as reversibly insertable into one of the gripper jaws of the gripper claw, in that it comprises a finger base, which has a depression complementary to the respective corresponding holding cone of the holding mandrel of the gripper claw, and the holding cone being defined in that its length is at least one-third of its largest diameter, and its smallest diameter is at most 90% of the largest cone diameter.

The gripper claw/gripper finger combination according to the invention is additionally characterized in that the two gripper jaws and the finger bases of the two gripper fingers comprise holding means, which hold the gripper fingers in a stop position on the respective gripper jaws, and the two gripper jaws and the finger bases of the two gripper fingers comprise stabilization means, which are implemented so that, in operational combination with the holding cone, they prevent tilting of the gripper fingers around the holding axis.

The two gripper jaws are preferably fastened so they are movable using their respective first jaw flange on a common linear guide and are implemented as movable toward one another and away from one another in the direction of the first axis mirror-symmetrically and synchronously along this common linear guide by means of a common, toothed belt driven by a motor.

The holding mandrels are preferably implemented as a holding cone, combinations of conical and cylindrical shapes also being preferred. Conical holding mandrels which engage in complementary, conical depressions on the gripper fingers are especially preferred.

The gripper claw/gripper finger combination according to the invention is further characterized according to a first embodiment in that each of the two gripper jaws comprises a second jaw flange, which is perpendicular to the first axis and is fixedly connected to one first jaw flange in each case, the holding mandrels being fastened on one of these second jaw flanges in each case and directed toward the respective other holding mandrel so that their holding axis is arranged parallel to the first axis.

The gripper claw/gripper finger combination according to the invention is further characterized according to a second embodiment in that each of the two gripper jaws comprises a second jaw flange which is parallel to the first axis and fixedly connected perpendicularly to a first jaw flange in each case, the holding mandrels being fastened on one of these second jaw flanges in each case and being oriented parallel to the respective other holding mandrel so that their holding axis is situated perpendicularly to the first axis.

The gripper claw/gripper finger combination according to the invention is preferably characterized according to a first stabilization variant in that the first jaw flanges or the second jaw flanges comprise guide pins, which are aligned parallel to the holding mandrels and are situated at a distance to these holding mandrels, the finger bases of the gripper fingers comprising guide seats, which are implemented to hold the guide pins in the stop position of the gripper fingers, and the guide pins and guide seats, in operational combination with the holding mandrels and complementary depressions, preventing tilting of the gripper fingers.

The gripper claw/gripper finger combination according to the invention is preferably characterized according to a second stabilization variant in that the finger bases of the gripper fingers comprise counter surfaces, which are applied in the stop position of the gripper fingers to stop surfaces of the jaw flanges and, in operational combination with the holding mandrels, prevent tilting of the gripper fingers.

The gripper claw/gripper finger combination according to the invention is preferably characterized according to a third stabilization variant in that the holding mandrels of the gripper claw and the complementary depressions of each finger base have a corresponding cross section deviating from a circular shape, whereby tilting of the gripper fingers in their stop position is prevented.

This object is achieved according to a second aspect in that a method for receiving two gripper fingers using a gripper claw/gripper finger combination according to the invention as herein disclosed is proposed. This method according to the invention is characterized in that it comprises the following steps:
(a) providing two gripper fingers having a mount, these gripper fingers being aligned to one another and presented to the gripper claw so that the gripper jaws can be moved into a retracted position using the gripper claw;
(b) moving the gripper jaws of the gripper claw into the retracted position, in which the holding mandrels of the gripper claw are directly opposite to the complementary depressions of the finger bases of the two gripper fingers;
(c) engaging the holding mandrels of the gripper claw in the complementary depressions of the finger bases of the two gripper fingers until the gripper fingers reach their stop position on the respective gripper jaws; and
(d) moving the gripper fingers received using the gripper claw out of the mount.

This object is achieved according to a third aspect in that a method for releasing two gripper fingers using a gripper claw/gripper finger combination according to the invention as herein disclosed is proposed. This method according to the invention is characterized in that it comprises the following steps:
(a) lowering the two gripper fingers received using the gripper claw toward a mount having a link and moving the gripper claw until the gripper fingers of the gripper claw assume an end position; and
(b) moving the holding mandrels of the gripper claw out of the complementary depression of the finger bases of the two gripper fingers until the holding mandrels of the gripper claw exit from the complementary depressions of the finger bases of the two gripper fingers.

It is preferable in this method for the movement of the gripper claw in step (a) to be performed until holding pins of the link engage in corresponding holding seats of the finger bases.

Further features according to the invention and preferred embodiments result from the respective dependent claims.

Advantages of the gripper claw according to the invention comprise:
The gripper fingers are held securely on the gripper jaws, without a lock being provided or being executed, as is known, e.g., from GB 2 130 550 A, DE 37 15 140 A1, and U.S. Pat. No. 5,360,249.
The holding of the gripper fingers on the gripper jaws is functionally and structurally divided into:
  a support function, which is provided by formfitting holding cones engaging in depressions,
  a slip guard, which is provided by holding means, and
  a tilt guard, which is provided by the securing means.
According to the particularly preferred first embodiment, the gripping movements of the parallel gripper are primarily also used to receive/release the gripper fingers.
According to the preferred second embodiment, the movements of the robot are primarily used to receive/release the gripper fingers.

BRIEF INTRODUCTION OF THE ATTACHED DRAWINGS

The gripper claw according to the invention having replaceable gripper fingers is explained in greater detail on the basis of the appended drawings, these drawings showing exemplary embodiments and not restricting the scope of the present invention. In the figures:

FIG. 2 shows views of a gripper claw/gripper finger combination having laterally arranged holding mandrels according to the first embodiment of FIG. 1:

FIG. 7 shows a selection of holding mandrels for a gripper claw having replaceable gripper fingers according to a third stabilization variant having non-rotationally symmetric holding mandrels for use in combination with a holding mandrel/magnetic holding means or holding mandrel/spring holding means combination:

FIG. 8 shows the receiving and depositing of the replaceable gripper fingers from or in the link of a holder, in:

FIG. 9 shows three embodiments of the gripper claw/gripper finger combination according to the invention with respect to the arrangement of the holding mandrels, the corresponding finger base and link implementation, and the receiving and releasing method for the replaceable gripper fingers thus required:

FIG. 10 shows the claw housing for a parallel gripper known from European patent EP 0 993 916 B1 (cf. therein: FIG. 6) according to a first variant having toothed belt drive;

FIG. 11 shows the claw housing for a parallel gripper known from European patent EP 0 993 916 B1 (cf. therein: FIG. 8) according to a second variant having toothed rack drive;

DETAILED DESCRIPTION OF THE PRESENT INVENTION

The gripper claw according to the invention having replaceable gripper fingers or the gripper claw/gripper finger combination according to the invention will be explained in greater detail.

Figure 1:
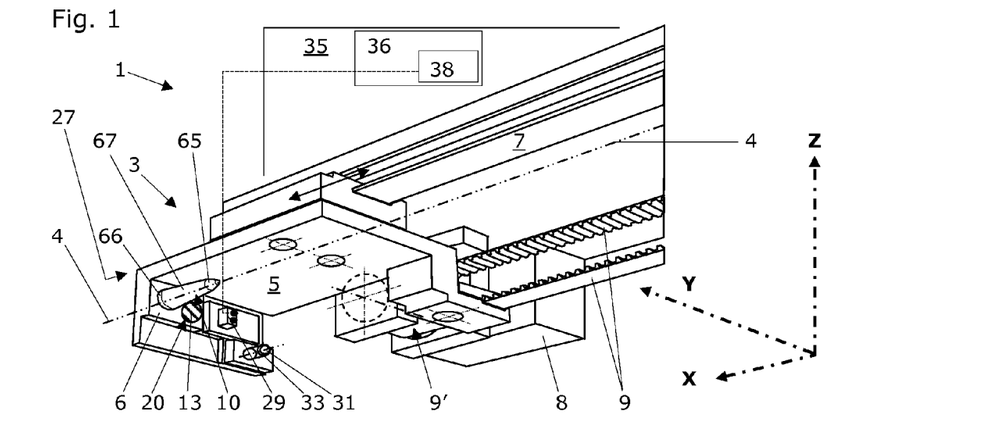
FIG. 1 shows a three-dimensional view of a gripper jaw of a gripper claw according to the invention in a three-dimensional coordinate system, a first embodiment of the gripper claw according to the invention having a lateral holding mandrel arrangement and having a holding mandrel/guide pin combination according to a first stabilization variant and having magnetic holding means being shown.

FIG. 1 shows a three-dimensional view of one of the two gripper jaws 3,3' of a gripper claw 1 according to the invention according to a first embodiment having a lateral holding mandrel arrangement and the arrangement thereof in a three-dimensional coordinate system. The lateral fastening of the holding mandrels 10,10 is preferably selected so that the holding mandrels 10,10' are arranged coaxially to a first axis 4. The first axis 4 extends parallel to the horizontal X axis of a Cartesian coordinate system.

A part of a gripper claw 1 is shown having replaceable gripper fingers 2,2' (cf. FIG. 2) for grasping and depositing objects. This gripper claw 1 comprises two gripper jaws 3,3', only one of which is shown here. The gripper jaws 3,3' each comprise one first jaw flange 5,5' parallel to the first axis 4. These two gripper jaws 3,3' are fastened so they are movable using their respective first jaw flange 5,5' on at least one linear guide 7 and are implemented as movable toward one another and away from one another in the direction of the first axis 4 along this at least one linear guide 7 by means of at least one drive 8. Each of the two gripper jaws 3,3' comprises a holding mandrel 10,10' having a holding axis 40 (cf. FIG. 9), each of the two gripper fingers 2,2' being implemented as reversibly insertable into one of the gripper jaws 3,3' of the gripper claw 1 in each case, in that it comprises a finger base 11,11', which has a depression 12,12' complementary to the respective corresponding holding mandrel 10,10' of the gripper claw 1 (cf. FIG. 2). The two gripper jaws 3,3' and the finger bases 11,11' of the two gripper fingers 2,2' comprise holding means 13,13'; 14,14', which hold the gripper fingers 2,2' in a stop position 15,15' on the respective gripper jaw 3,3' (cf. FIG. 2).

The two gripper jaws 3,3' are fastened so they are movable using their respective first jaw flange 5,5' on a preferably common linear guide 7 and are preferably implemented as movable toward one another and away from one another in the direction of the first axis 4 mirror-symmetrically and synchronously along this common linear guide 7 by means of a common toothed belt 9 driven by a motor. A drive 8 for this toothed belt 9 is shown in FIG. 1.

This preferred synchrony of the movements of the gripper jaws 3,3' and therefore also of the gripper fingers 2,2' is produced according to a preferred version in that one gripper jaw 3 is mechanically connected to the lower strand of the toothed belt 9 (cf. FIG. 1), and the other gripper jaw 3' is mechanically connected to the upper strand of the same toothed belt 9 (cf. FIG. 2).

Figure 10:
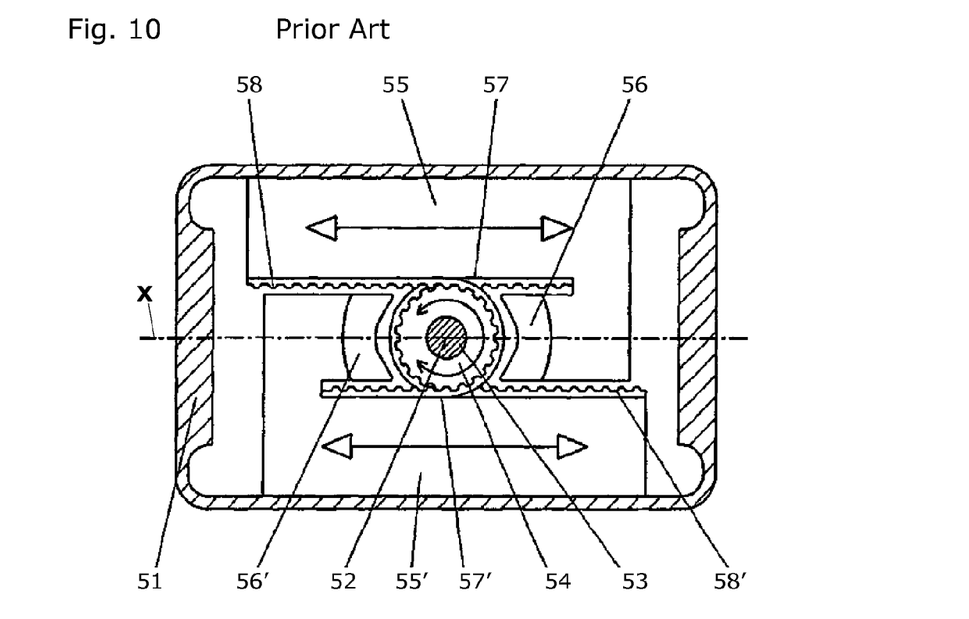
Figure 11:
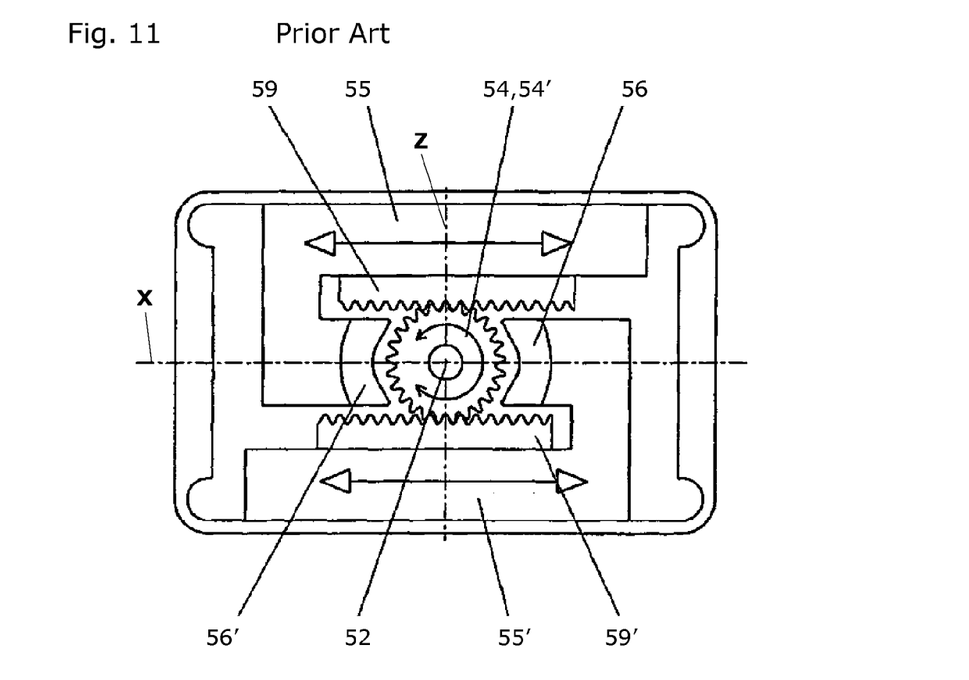

This preferred synchrony of the movements of the gripper jaws 3,3' and therefore also of the gripper fingers 2,2' is produced according to a first alternative version in that two toothed belts 58,58' are used to operationally link the two gripper jaws 3,3' with at least one gear wheel 54 according to the first variant disclosed in EP 0 993 916 B1 (cf. FIG. 10).

This preferred synchrony of the movements of the gripper jaws 3,3' and therefore also of the gripper fingers 2,2' is produced according to a second alternative version in that two toothed racks 59,59' are used to operationally link the two gripper jaws 3,3' to at least one gear wheel 54 according to the second variant (cf. FIG. 11) disclosed in EP 0 993 916 B1.

In the gripper claws 1 having gripper fingers 2,2' according to a first preferred embodiment, each of the two gripper jaws 3,3' comprises a second jaw flange 6,6', which is perpendicular to the first axis 4 and is fixedly connected in each case to a first jaw flange 5,5'. The holding mandrels 10,10' are each fastened on one of these two jaw flanges 6,6' and oriented in relation to the respective other holding mandrel 10,10' so that their holding axis 40 is arranged parallel to the first axis 4. In the Cartesian coordinate system, the holding axes 40 of the holding mandrels 10,10' are therefore also aligned parallel to the horizontal X axis. The two holding mandrels 10,10' are particularly preferably aligned toward one another concentrically on a common first axis 4. FIG. 1 additionally shows a gripper claw according to the invention having a holding mandrel/guide pin combination according to a first stabilization variant, which is equipped with magnetic holding means.

This first stabilization variant of the gripper claw 1 according to the invention having gripper fingers 2,2' is characterized in combination with the first embodiment of the gripper claw 1 in that the second jaw flanges 6,6' comprise guide pins 31,31', which are aligned parallel to the holding mandrels 10,10' and are arranged at a distance to these holding mandrels 10,10'. In addition, the finger bases 11,11' of the gripper fingers 2,2' comprise guide seats 32,32', which are implemented to hold the guide pins 31,31' in the stop position 15,15' of the gripper fingers 2,2' (cf. FIG. 2). According to this first stabilization variant, the guide pins 31,31' and guide seats 32,32', in operational combination with the holding mandrels 10,10' and complementary depressions 12,12', prevent tilting of the gripper fingers 2,2' received using the gripper jaws 3,3'.

The guide pins 31,31' preferably have a circular cross section, and the guide seats 32,32' are preferably selected from a group which comprises bores, slots, and oblong holes. The guide pins 31,31' and guide seats 32,32' preferably comprise infeed cones 33,33';34,34'.

Notwithstanding the illustration in FIGS. 1-3, 8, and 9, the guide pins 31,31' can also be implemented as cones, which accordingly engage in the guide seats 32,32', which are implemented as conical depressions, slots, or oblong holes. The slots or oblong holes preferably have beveled flanks, which are adapted in their inclination to the tapering of the conical guide pins 31,31' (not shown).

The gripper claw 1 according to the invention shown here having gripper fingers 2,2' preferably comprises first holding means 13,13' for holding two gripper fingers 2,2' in a stop position 15,15' on the respective gripper jaws 3,3', which are implemented as first magnetic means, which are arranged on magnet positions 20,20' of the second jaw flanges 6,6'. Second holding means 14,14' for holding the two gripper fingers 2,2' in a stop position 15,15' on the respective gripper jaw 3,3' are preferably implemented as second magnetic means, which are arranged on correspondingly placeable counter positions 21,21' of the gripper fingers 2,2' (cf. FIG. 2).

The first magnetic means are preferably selected from a group which comprises electromagnets and permanent magnets. The second magnetic means are preferably selected from a group which comprises permanent magnets and magnetizable metal parts. The material for the permanent magnets of the first holding means 13,13' and/or the second holding means 14,14' is preferably selected from a group which comprises alloys of iron, nickel, and/or aluminum (possibly having additives of cobalt and manganese); ceramic materials (such as barium or strontium hexaferrite); and sintered rare earth elements (such as cobalt-samarium or neodymium-iron-boron mixtures). The material for the magnetizable metal parts of the second holding means 14,14' is preferably selected from a group which comprises iron, nickel, and an alloy having one or both of these metals.

FIG. 1 additionally shows a schematic robot 35 having a controller 36. Each of the gripper jaws 3,3' of the gripper claw 1 preferably comprises a contact unit 29,29', which is operationally linked to an analysis unit 38 of the controller 36 of the robot 35. Each of the gripper fingers 2,2' insertable into the gripper claw 1 preferably also comprises an identification unit 30,30' (cf. FIG. 3), which is in a read contact with the contact unit 29,29' in the stop position 15,15' of the gripper fingers 2,2', so that each gripper finger 2,2' is identifiable using the analysis unit 38 of the robot 35.

The holding mandrels 10,10' preferably also comprise at least one cylindrical section 66,66'. This cylindrical section 66,66' can follow the holding cones 67,67' in the insertion direction in the complementary depressions 12,12' of the finger bases 11,11' (cf. also FIG. 9). This or an additional cylindrical section 66,66' can also be arranged between the holding cone 67,67' and the centering cone 65,65' (not shown).

FIG. 2 shows views of a gripper claw/gripper finger combination having laterally arranged holding mandrels according to the first embodiment from FIG. 1.

Figure 2A:
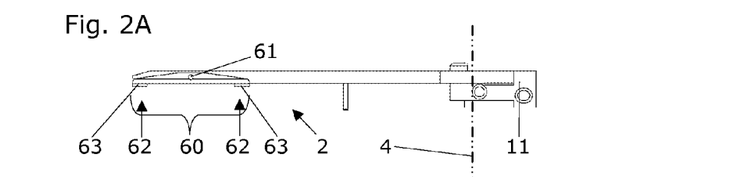
FIG. 2A showing a top view of a gripper finger according to the invention insertable in the gripper claw according to FIG. 2B.
Figure 2B:
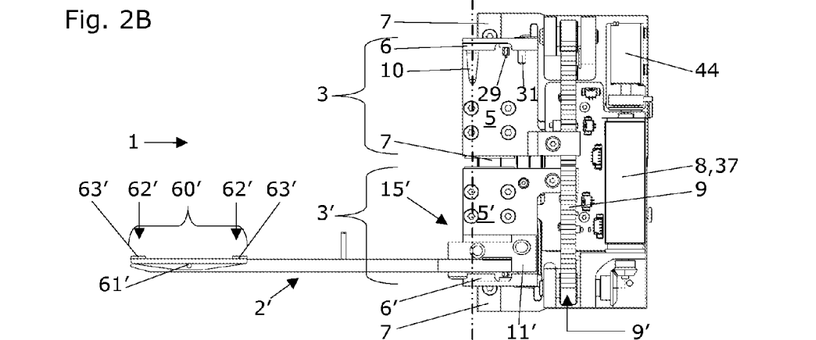
FIG. 2B showing a top view of a gripper claw according to the invention having an inserted gripper finger.

FIG. 2A shows a top view of a gripper finger 2 according to the invention, which is insertable into the gripper claw 1 shown in FIG. 2B, having a finger base 11. FIG. 2B shows a top view of a gripper claw 1 according to the invention having an inserted gripper finger 2' complementary to that shown in FIG. 2A. The gripper claw 1 comprises two gripper jaws 3,3', which each comprise a first jaw flange 5,5' parallel to a first axis 4. These two gripper jaws 3,3' are fastened so they are movable using their respective first jaw flange 5,5' here on a common linear guide 7 and are implemented as movable toward one another and away from one another in the direction of the first axis 4 along this linear guide 7 by means of a drive 8. Each of the two gripper jaws 3,3' comprises a holding mandrel 10,10' having a holding axis 40 and each of the two gripper fingers 2,2' is implemented as reversibly insertable into one of the gripper jaws 3,3' of the gripper claw 1 in each case, in that it comprises a finger base 11,11', which has a depression 12,12' complementary to the respective corresponding holding mandrel 10,10' of the gripper claw 1. The first jaw flange 5 is mechanically connected to the upper strand of the common toothed belt 9 and the second jaw flange 5' is mechanically connected to the lower strand of the common toothed belt 9. The drive 8 preferably comprises a gearing 37 and is preferably also connected to a solenoid brake 44, which, in the event of a power failure, prevents the two gripper jaws 3,3' from being able to move unintentionally away from one another.

Figure 2C:
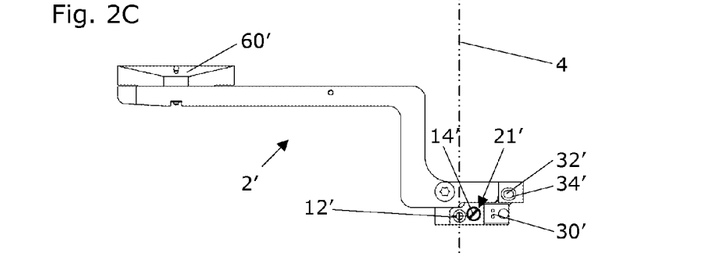
FIG. 2C shows a side view of the gripper finger according to the invention removed from the gripper claw of FIG. 2B.

FIG. 2C shows a side view of the gripper finger 2' according to the invention removed from the gripper jaw 1 from FIG. 2B.

It is obvious from FIG. 2 that the two gripper jaws 3,3' and the finger bases 11,11' of the two gripper fingers 2,2' comprise holding means 13,13';14,14', which hold the gripper fingers 2,2' in a stop position 15,15' on the respective gripper jaws 3,3'. The counter position 21' of the gripper finger 2' having the second holding means 14' arranged thereon for holding the gripper finger 2' in a stop position 15' on the gripper jaw 3' is visible in FIG. 2C. The complementary depression 12' for receiving the holding mandrel 10' and the guide seat 32' having the infeed cone 34' for receiving the guide pin 31' and the identification unit 30' of the gripper finger 2' are also shown in FIG. 2C.

In addition, it is preferable for the gripper fingers 2,2' to comprise a movable section 60,60', which is connected via a joint 61,61' to the respective gripper finger 2,2'. Each movable section 60,60' preferably comprises two contact points 62,62' to be applied to or to grasp a vessel or laboratory article. Each contact point 62,62' preferably comprises at least one or two rubber cushions 63,63', which prevent an object received using the parallel gripper from slipping off.

In addition, it is shown that each of the two gripper jaws 3,3' comprises a second jaw flange 6,6', which is perpendicular to the first axis 4 and is fixedly connected to one first jaw flange 5,5' in each case, the holding mandrels 10,10' being fastened on one of the second jaw flanges 6,6' and oriented toward the respective other holding mandrel 10',10 in each case in such a manner that their holding axis 40 is arranged parallel to the first axis 4. In the Cartesian coordinate system, the holding axes 40 of the holding mandrels 10,10' are therefore also aligned parallel to the horizontal X axis. The two holding mandrels 10,10' are particularly preferably implemented as a cone and are aligned toward one another concentrically on a common first axis 4.

Figure 3:
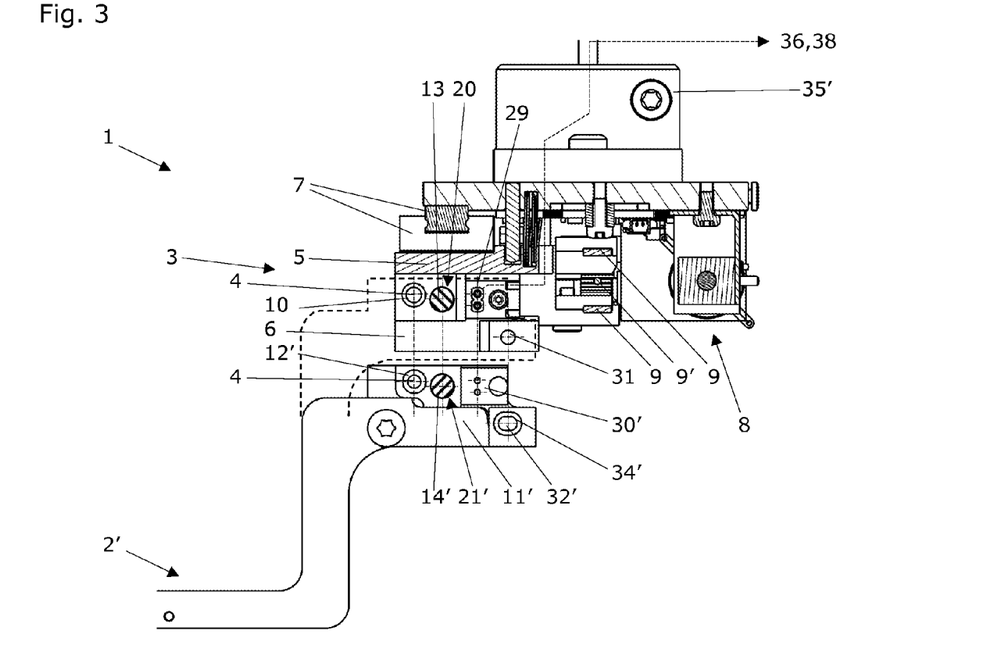
FIG. 3 shows a mirrored partial cross section through a gripper claw according to the first embodiment of FIG. 1 having laterally arranged holding mandrels, before the insertion of a gripper finger.

FIG. 3 shows a mirrored partial cross section through a gripper claw 1 fastened on a robot arm 35' according to the first embodiment from FIG. 1 having laterally arranged holding mandrels 10,10', before the insertion of a gripper finger 2' in the gripper jaws 3'. The linear guide 7, on which the first jaw flange 5 is fixed in a sliding manner, and the second jaw flange 6 having the holding mandrel 10, which is arranged coaxially to the first axis 4, are well visible. The first jaw flange 5 is mechanically connected to the lower strand of the toothed belt 9, which is moved using the electrical drive 8. In addition, the second jaw flange 6 comprises a guide pin 31, which interacts in a stabilizing manner with the holding mandrel 10; a magnet position 20 having a first holding means 13 implemented as magnetic means fastened thereon; and a contact unit 29, which is electrically connected to the analysis unit 38 of the controller 36 of the robot 35.

The gripper finger 2' comprises a finger base 11' having a complementary, preferably conical depression 12' arranged coaxially to the first axis 4; a guide seat 32', implemented as an oblong hole, having an infeed cone 34'; a second holding means 14', implemented as magnetic means, which is arranged in a counter position 21', and an identification unit 30', which provides identification data of the gripper finger 2' for the analysis unit 38 of the controller 36 of the robot 35.

Figure 4:
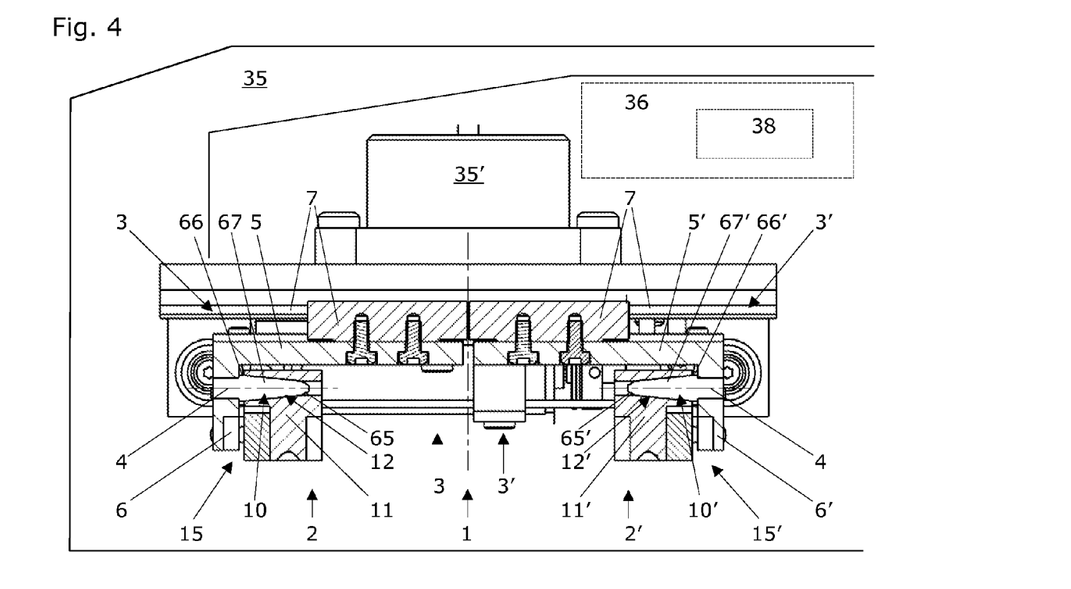
FIG. 4 shows a longitudinal section through a gripper claw according to the first embodiment of FIG. 1 having laterally arranged holding mandrels, having two inserted gripper fingers.

FIG. 4 shows a longitudinal section through a gripper claw 1, which is fastened on the robot arm 35', according to the first embodiment of FIG. 1 having holding mandrels 10,10' arranged laterally on the two flanges 6,6'. The two inserted gripper fingers 2,2', which are received by the two gripper jaws 3,3', are located in their stop position 15,15', which is defined by the deep seat of the holding mandrels 10,10' in the corresponding complementary depressions 12,12' in the finger bases 11,11'. The two first jaw flanges 5,5' are connected in a sliding manner to the common linear guide 7. The contact units 29,29' (not visible here) on the finger bases 11,11' are electrically connected to the analysis unit 38 of the controller 36 of the robot 35. The read contact between the contact units 29,29' and the identification units 30,30' can be implemented, for example, as an electrically conductive contact (e.g., upon the placement of an EPROM in the gripper finger) or as a wireless communication (e.g., by means of RFID tags).

Figure 5:
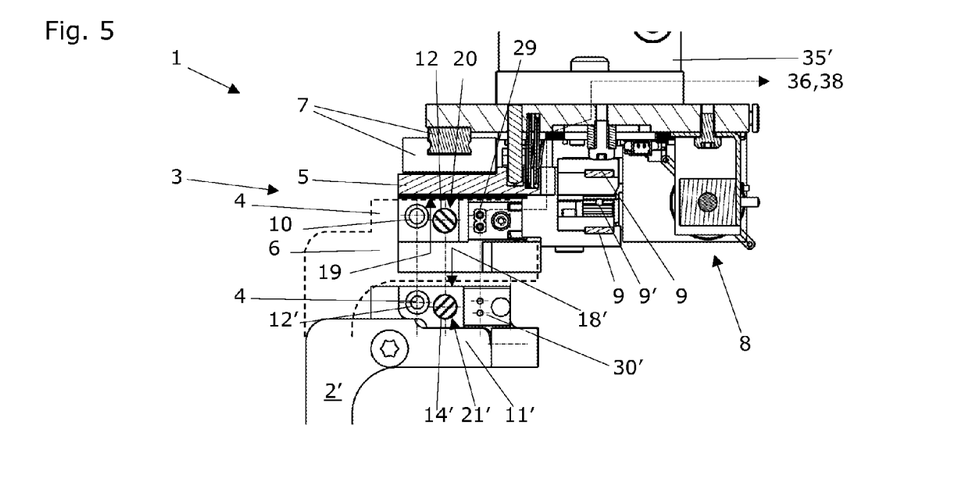
FIG. 5 shows a mirrored partial cross section through a gripper claw according to the first embodiment having laterally arranged holding mandrels and having a holding mandrel/counter surfaces/stop surfaces combination according to a second stabilization variant and having magnetic holding means before the insertion of a gripper finger.

FIG. 5 shows a mirrored partial cross section through a gripper claw 1 according to the first embodiment, which is attached on a robot arm 35', having laterally arranged holding mandrels and having a holding mandrel/counter surfaces/stop surfaces combination and having magnetic holding means before the insertion of a gripper finger 2'. The holding mandrels/counter surfaces/stop surfaces combination according to a second stabilization variant is characterized in that the finger bases 11,11' of the gripper fingers 2,2' comprise counter surfaces 16,16';18,18', which are applied in the stop position 15,15' of the gripper fingers 2,2' to stop surfaces 17,17';19,19' of the jaw flanges 6,6' and, in operational combination with the holding mandrels 10,10', prevent tilting of the gripper fingers 2,2' inserted into the gripper claw 1.

Therefore, this second stabilization variant differs from the first solely in that no guide pins 31,31' are located on the second jaw flanges 6,6' and no guide seats 32,32', which are suitable for this stabilization variant, are located on the gripper fingers 2,2'. The gripper finger 2' therefore comprises a finger base 11' having a complementary depression 12' arranged coaxially with the first axis 4; a second holding means 14' implemented as magnetic means, which is arranged in a counter position 21', and an identification unit 30', which provides the identification data of the gripper finger 2' for the analysis unit 38 of the controller 36 of the robot 35.

Figure 6:
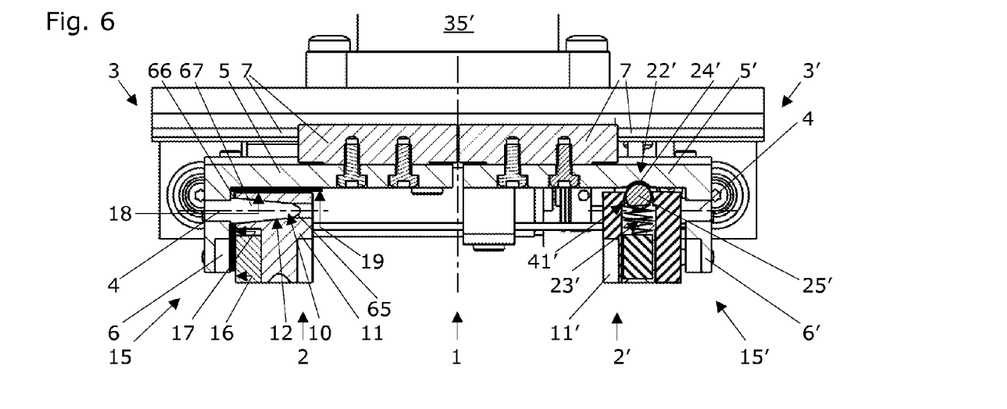
FIG. 6 shows a longitudinal section through a gripper claw having two inserted gripper fingers, according to the first embodiment having laterally arranged holding mandrels and according to the second stabilization variant and having magnetic holding means from FIG. 5 (left side); or according to the first embodiment and having a holding mandrel/guide pin combination according to the first stabilization variant and having spring holding means (right side), respectively.
Figure 7A:
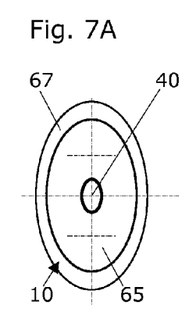
FIG. 7A showing an ellipsoid cone.
Figure 7B:
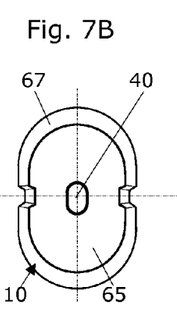
FIG. 7B showing an oval cone.
Figure 7C:
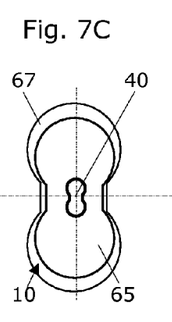
FIG. 7C showing a figure-8 cone.
Figure 7D:
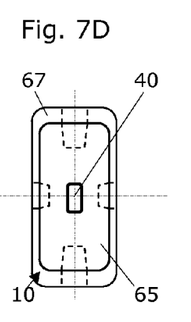
FIG. 7D showing an approximately pyramidal cone.

FIG. 6 shows a longitudinal section through a gripper claw 1, which is arranged on a robot arm 35', having two inserted gripper fingers 2,2', according to the first embodiment having laterally arranged holding mandrels 10,10'. The second stabilization variant of FIG. 5 having magnetic holding means is shown on the left side:

It is preferable for each finger base 11,11' to comprise a first counter surface 16,16', which, upon assuming the stop position 15,15' on the respective gripper jaw 3,3', is aligned parallel to a first stop surface 17,17' of the corresponding second jaw flange 6,6'. The first counter surfaces 16,16' and stop surfaces 17,17' are preferably aligned perpendicularly (as shown) or parallel (not shown) to the first axis 4.

Furthermore, it is preferable for each finger base 11,11' to comprise a second counter surface 18,18', which, upon assuming the stop position 15,15' on the respective gripper jaw 3,3', is aligned parallel to a second stop surface 19,19' of the corresponding first jaw flange 6,6'. In addition, it is preferable for the second counter surfaces 18,18' and stop surfaces 19,19' to be aligned parallel to the first axis 4.

The holding mandrel/guide pin combination according to the first stabilization variant having spring holding means is shown on the right side:

First spring holding means 22,22' are preferably implemented as one or more depression(s) 24,24' in second stop surfaces 19,19' of the first jaw flanges 5,5' or second jaw flanges 6,6'. Second spring holding means 23,23' are preferably implemented as bodies 25,25', which are spring mounted in a recess 41,41' in the respective second counter surface 18,18'. These spring-mounted bodies 25,25' are preferably selected from a group which comprises balls, round bolts, and ellipsoids as well as parts thereof. The second spring holding means 23,23' preferably comprise a spring, which is selected from a group which comprises coiled springs and leaf springs.

In general: If rotationally-symmetric conical mandrels 10,10' having a circular cross section are used as the holding mandrels, it is preferable for the two conical mandrels 10,10' to have a specific ratio of the largest cone diameter to the cone length. The holding cone 67,67' according to the invention is defined in that its length is at least one-third of its largest diameter, and its smallest diameter is at most 90% of the largest cone diameter.

It is especially preferable for the two conical mandrels 10,10' to have two conical cone sections following one another, which have a length ratio of 22/3 and a nominal width reduction in the ratio of 5/3 and 3/1.

A cone angle α, which is 11.5°, is very especially preferred for the implementation of the holding mandrels as conical mandrels 10,10', the cone having a length of 11 mm.

Notwithstanding the illustration in FIGS. 1-3, 8, and 9, the guide pins 31,31' can also be implemented as cones, which accordingly engage in conical depressions, slots, or oblong holes. The slots or oblong holes preferably have beveled flanks, which are adapted in their inclination to the taper of the conical guide pins.

FIG. 7 shows a selection of holding mandrels 10,10' for a gripper claw 1 having replaceable gripper fingers 2,2' according to a third stabilization variant. This third stabilization variant is characterized in that the holding mandrels 10,10' of the gripper claw 1 and the complementary depressions 12,12' of each finger base 11,11' have a corresponding cross section deviating from a circular shape, whereby tilting of the gripper fingers 2,2', which are inserted into the gripper claw 1, is prevented in their stop position 15,15'. These holding mandrels 10,10' of the gripper claw 1 and the depressions 12,12' complementary thereto of each finger base 11,11' preferably have a cross section deviating from a circular shape (for example, pyramidal, elliptical, oval, or a figure-8) and are preferably used in conjunction with a holding mandrel/magnetic means or holding mandrel/spring holding means combination. Exemplary views of an ellipsoid cone (cf. FIG. 7A), an oval cone (cf. FIG. 7B), a figure-8 cone (cf. FIG. 7C), and an approximately pyramidal cone (cf. FIG. 7D) are shown. If desired, an arbitrary number of milled grooves (partially implemented in FIG. 7B and partially indicated in FIG. 7D) can be applied to the surfaces of the holding mandrels 10,10', which extend coaxially to the holding axis 40. Such milled grooves can supply or remove air, for example, and therefore make it easier to insert or withdraw the holding mandrels 10,10'.

The holding mandrels 10, 10' themselves and/or the corresponding complementary depressions 12, 12' preferably comprise deaeration holes or ventilation holes, so that a partial vacuum or overpressure cannot form in the complementary depressions 12,12' upon insertion or withdrawal of the holding mandrels 10,10'.

FIG. 8 shows the receiving and depositing of the replaceable gripper fingers 2,2' from or in, respectively, the link 28 of a mount 26. The link 28 of the mount 26 preferably comprises holding pins 42,42', for receiving gripper fingers 2,2' released by the gripper claw 1, which plunge in a formfitting manner into corresponding holding seats 43,43' in the finger bases 11,11' and thus securely hold the deposited gripper fingers 2,2' on the link. The mount 26 preferably stands on a work surface of a robotic laboratory facility 39 or a so-called "robotic sample processor", for example, the GENESIS Freedom® Workstation or the Freedom EVO® Platform (both available from Tecan Trading AG, 8708 Mannedorf, Switzerland).

Figure 8A:
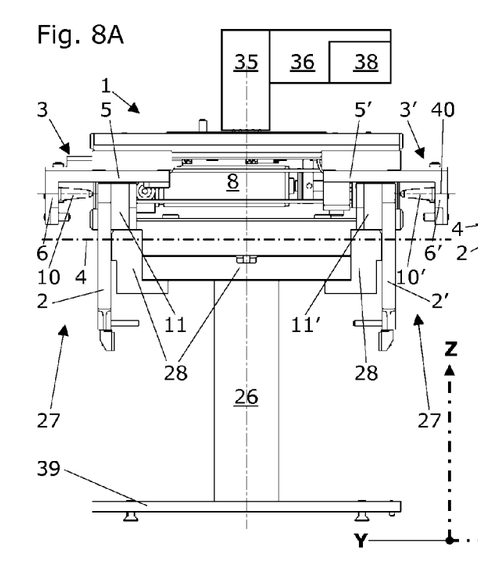
FIG. 8A the holding mandrels of the gripper claw assuming a retracted position and being directly opposite the complementary depressions of the finger bases of the two gripper fingers.

In FIG. 8A, the holding mandrels 10,10' of the gripper claw 1 assume a retracted position and are directly opposite to the complementary depressions 12,12' of the finger bases 11,11' of the two gripper fingers 2,2'.

Figure 8B:
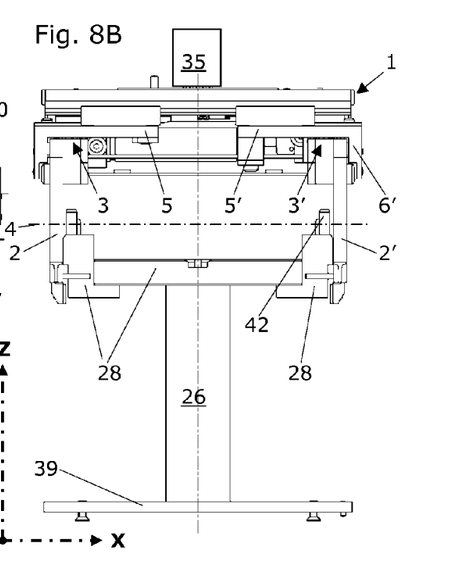
FIG. 8B the holding mandrels of the gripper claw reaching their stop position on the respective gripper jaws while engaging in the complementary depressions of the finger bases of the two gripper fingers and the received gripper fingers being raised with the gripper claw from the mount.

In FIG. 8B, the holding mandrels 10,10' of the gripper claw 1 engage in the complementary depressions 12,12' of the finger bases 11,11' of the two gripper fingers 2,2' and reach their stop position 15,15' on the respective gripper jaws 3,3'. The received gripper fingers 2,2' are raised using the gripper claw 1 from the mount 26.

One or more mount(s) 26 are preferably located in a region especially provided for this purpose of the robotic laboratory facility 39. This region can be located both on a work surface of the laboratory facility 39 or also adjacent to, above, or below the table level of this laboratory facility 39. Differently implemented pairs of gripper fingers 2,2' can be provided for the robot arm 35' of the robotic laboratory facility 39 in multiple mounts 26. Each gripper finger pair can be especially implemented and individually capable of grasping or manipulating selected vessels, such as test tubes, liquid containers, standard microplates, etc. The implementation of a gripper finger pair for grasping different objects is also conceivable and desired.

FIG. 9 shows two embodiments according to the invention of the gripper claw/gripper finger combination according to the invention with respect to the arrangement of the holding mandrels, the corresponding finger base and link implementation, and the receiving and releasing method for the replaceable gripper fingers thus carried out.

Figure 9A:
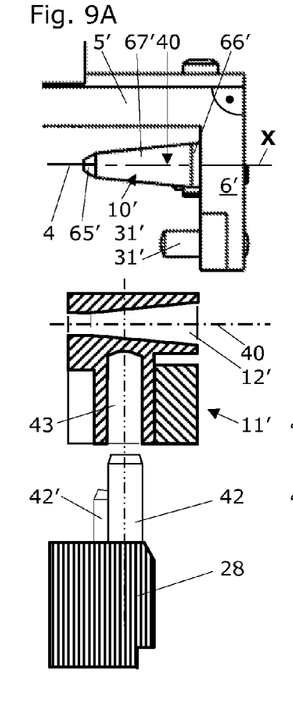
FIG. 9A showing the first embodiment having holding mandrels aligned in the direction of the X axis, and FIG. 9B showing the second embodiment.

FIG. 9A shows the first embodiment having holding mandrels 10,10' aligned in the direction of the X axis or the first axis 4. The above-illustrated holding mandrels 10,10' and the guide pins 31,31' are preferably fastened using a press fit on the two jaw flanges 6,6'. The holding axis 40 is identical to the X axis here.

In the middle, a part of a corresponding finger base 11' having its complementary depression 12' is shown, this complementary depression 12' extending with its holding axis 40 in the direction of the X axis or the first axis 4. In addition, this finger base 11,11' shown here has vertical holding seats 43,43', only one of these holding seats being shown.

At the bottom, a part of a corresponding link 28 having two vertically protruding holding pins 42,42' is shown, which fit in a formfitting manner in the vertical holding seats 43,43' of the respective finger base 11,11'.

The first embodiment of the arrangement of the holding mandrels 10,10' and the arrangement of the holding pins/holding seats shown here allows a first method for the robotic receiving of two gripper fingers 2,2' using a gripper claw 1/gripper finger 2,2' combination, this method comprising the following steps:
(a) providing two gripper fingers 2,2' having a mount 26, these gripper fingers 2,2' being aligned to one another and presented to the gripper claw 1 so that the gripper jaws 3,3' can be moved into a retracted position 27 using the gripper claw 1;
(b) moving the gripper jaws 3,3' of the gripper claw 1 into the retracted position 27, in which the holding mandrels 10,10' of the gripper claw 1 are directly opposite to the complementary depressions 12,12' of the finger bases 11, 11' of the two gripper fingers 2,2';
(c) engaging the holding mandrels 10,10' of the gripper claw 1 in the complementary depressions 12,12' of the finger bases 11,11' of the two gripper fingers 2,2' until the gripper fingers 2,2' reach their stop position 15,15' on the respective gripper jaws 3,3'; and
(d) moving the gripper fingers 2,2' received using the gripper claw 1 out of the mount 26.

The engagement of the holding mandrels 10,10' in step (c) is preferably caused here by a horizontal contraction of the two gripper jaws 3,3' in the direction of the first axis 4 and, upon the movement of the gripper fingers 2,2' out of the mount 26, the gripper claw 1 is vertically raised in relation to the mount 26.

Figure 9B:
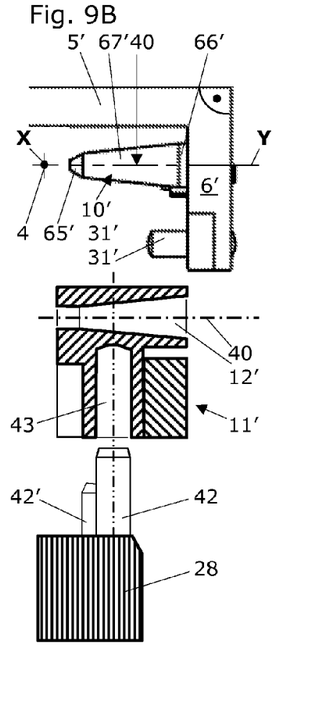

FIG. 9B shows the second embodiment having holding mandrels 10,10' aligned parallel to one another and perpendicularly to the direction of the X axis or the first axis 4. The holding mandrels 10,10' and the guide pins 31,31' are preferably fastened using a press fit on the second jaw flanges 6,6'. The holding axis 40 is identical to the Y axis here.

In the middle, a part of a corresponding finger base 11' having its complementary depression 12' is shown, this complementary depression 12' extending with its holding axis 40 in the direction of the Y axis or perpendicularly to the first axis 4. In addition, this finger base 11,11' shown here has vertical holding seats 43,43', only one of these holding seats being shown.

A part of a corresponding link 28 having two vertically protruding holding pins 42,42' is shown at the bottom, which fit in a formfitting manner in the vertical holding seats 43,43' of the respective finger base 11,11'.

The engagement of the holding mandrels 10,10' in step (c) is preferably caused here by a horizontal advance of the two gripper jaws 3,3' in the direction perpendicularly to the first axis 4 and the gripper claw 1 is vertically raised in relation to the mount 26 upon moving of the gripper fingers 2,2' from the mount 26. It is preferable for the two gripper fingers 2,2' to be able to be withdrawn jointly and simultaneously from the link 28.

In all of these methods for the robotic or also manual receiving of two gripper fingers, it is preferable for the two gripper fingers 2,2' to be held during the execution of step (c) in a link 28 of the mount 26 so that the gripper fingers 2,2' can execute centering movements during the engagement of the holding mandrels 10,10' of the gripper claw 1 in the complementary depressions 12,12' of the finger bases 11,11' of the two gripper fingers 2,2'.

The holding mandrels 10,10' especially preferably also have, in addition to the holding cone 67,67', a centering cone 65,65', which precedes the holding cone 67,67' in the insertion direction into the complementary depressions 12,12' of the finger bases 11,11' (cf. FIGS. 1, 4, 6, and 9). These centering cones 65,65' make it easier to insert the holding mandrels 10,10' in the complementary depressions 12,12' and allow the mutual presentation of the holding mandrels 10,10' and complementary depressions 12,12' having substantially greater geometric tolerance and more generous centering movements.

Upon the use of spring holding means 22,22';23,23', it is preferable for the two gripper fingers 2,2' to be held during the execution of step (c) in a link 28 of the mount 26 so that, with the engagement of the holding mandrels 10,10' of the gripper claw 1 in the complementary depressions 12,12' of the finger bases 11,11' of the two gripper fingers 2,2', a spring force caused by the first and second spring holding means 22,22'; 23,23' is overcome, without the gripper fingers 2,2' deflecting.

The two disclosed embodiments according to the invention of the arrangement of the holding mandrels 10,10' and the above-described arrangements of the holding pins/holding seats allow a second method for the robotic or also manual releasing of two gripper fingers 2,2' using a gripper claw 1/gripper finger 2,2' combination, this method comprising the following steps:
(a) lowering the two gripper fingers 2,2', which are received using the gripper claw 1, toward a mount 26 having a link 28 and moving the gripper claw 1 until holding pins 42,42' of the link 28 engage in corresponding holding seats 43,43' of the finger bases 11,11' and until the gripper fingers 2,2' of the gripper claw 1 assume an end position; and
(b) moving the holding mandrels 10,10' of the gripper claw 1 out of the complementary depressions 12,12' of the finger bases 11,11' of the two gripper fingers 2,2' until the holding mandrels 10,10' of the gripper claw 1 exit from the complementary depressions 12,12' of the finger base 11,11' of the two gripper fingers 2,2'.

It is preferable for the movement of the gripper claws 1 in step (a) to occur until holding pins 42,42' of the link 28 engage in corresponding holding seats 43,43' of the finger bases 11,11'.

Upon the use of a gripper claw 1 according to the first embodiment having holding mandrels 10,10' aligned in the direction of the X axis or the first axis 4, it is preferable for moving out of the holding mandrels 10,10' in step (b) to be caused by horizontally moving the two gripper jaws 3,3' away from one another in the direction of the first axis 4.

Upon the use of a gripper claw 1 according to the second embodiment having holding mandrels 10,10' aligned parallel to one another and perpendicularly to the direction of the X axis or the first axis 4, it is preferable for moving out of the holding mandrels 10,10' in step (b) to be caused by a horizontal reverse movement of the two gripper jaws 3,3' in the perpendicular direction to the first axis 4.

In all of these methods for the robotic or also manual releasing of two gripper fingers, it is preferable for the two gripper fingers 2,2' to be held during the execution of step (b) in a link 28 of the mount 26 so that, with moving out of the holding mandrels 10,10' of the gripper claw 1 from the complementary depressions 12,12' of the finger bases 11, 11' of the two gripper fingers 2,2', a spring force caused by the first and second spring holding means 22,22';23,23' or a magnetic attraction force caused by the holding means 13,13';14, 14', which are implemented as first and second magnetic means, is overcome without the gripper fingers 2,2' deflecting.

Instead of a robot 35, other suitable means can also be used for receiving or releasing two gripper fingers 2,2' using the gripper claw 1 according to the invention. Manual receiving and/or releasing of the gripper fingers 2,2' is also provided.

These two above-described methods can be used for the purpose of robotically or automatically replacing the two gripper fingers 2,2' of a gripper claw 1 of a robotic laboratory facility 39.

Identical reference signs relate to corresponding features even if they are not described in detail in each case. Arbitrary combinations of the embodiments and variants described and/or shown are within the scope of the present invention.

The holding mandrels are preferably implemented as a holding cone, combinations of conical and cylindrical shapes also being preferred. These shapes are implemented for the purpose of engaging in corresponding complementary depressions on the gripper fingers. Conical holding mandrels which engage in complementary conical depressions on the gripper fingers are especially preferred. The attachment locations of the holding mandrels 10,10' and the complementary depressions 12,12' can also be exchanged, so that the holding mandrels are located on the gripper fingers and the conical depressions are arranged in or on the first jaw flanges 5,5' or in or on the second jaw flanges 6,6'.

In general, a holding cone 67,67' can also be identified by the synonym "support cone", because the holding cone 67,67' or support cone essentially carries the weight of the gripper finger 2,2' in whose complementary depression 12,12' the holding cone 67,67' engages. However, approximately half of the weight of the different objects or vessels or laboratory articles, such as test tubes, microplates, or microtubes, is also added to the weight of the gripper finger 2,2'.

Figure 12:
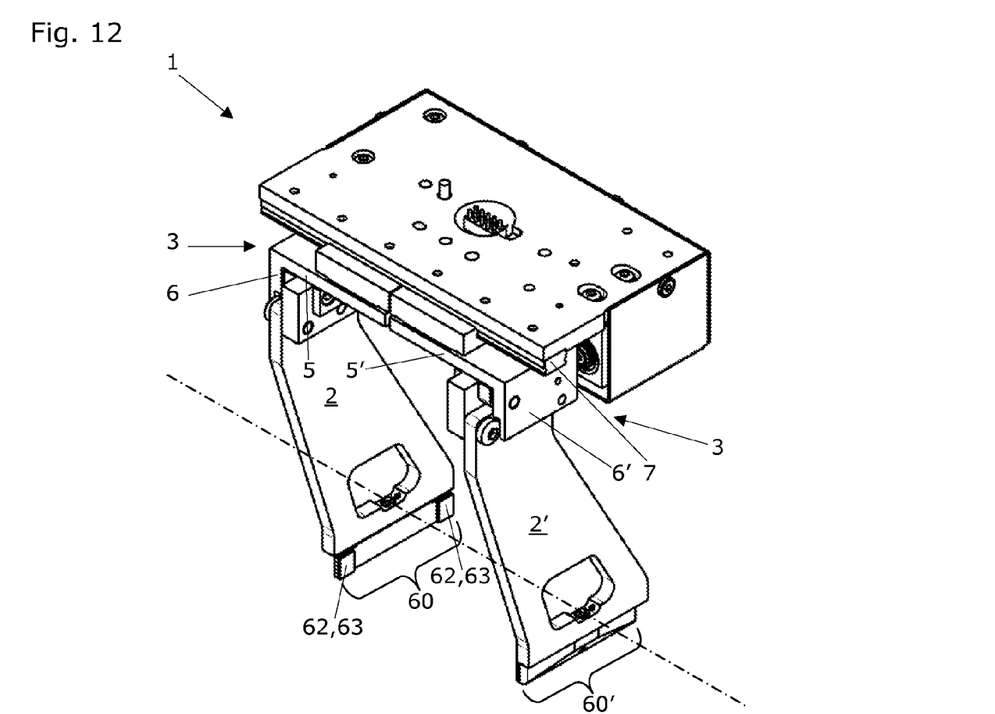
FIG. 12 shows an example of a parallel gripper according to the invention having gripper fingers for vertically grasping microplates.

FIG. 12 shows an example of a parallel gripper according to the invention having gripper fingers for vertically grasping microplates. The same reference signs as in FIGS. 1 to 9 identify identical or at least corresponding features here. The gripper claw 1 having the two gripper fingers 2,2' is implemented so that the gripper fingers 2,2' are aligned essentially symmetrically to an axis (cf. dot-dash line), which extends parallel to the X axis (cf. FIG. 1) and also parallel to the first axis 4. Both gripper fingers 2,2' preferably comprise, at their lower end, a movable section 60,60' having two contact points 62,62' having rubber cushions 63,63' to be applied to lateral surfaces of a microplate to be received.

Figure 13:
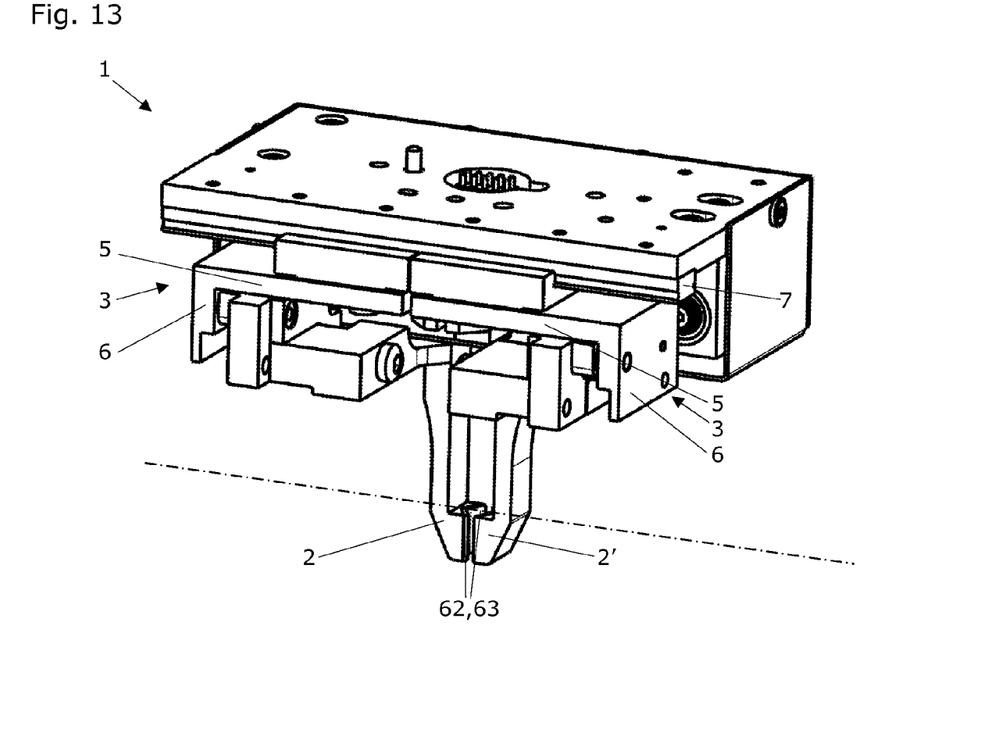
FIG. 13 shows an example of a parallel gripper according to the invention having gripper fingers for vertically grasping test tubes.

FIG. 13 shows an example of a parallel gripper according to the invention having gripper fingers for vertically grasping test tubes. Glass tubes having blood samples, for example, are referred to as test tubes. The same reference signs as in FIGS. 1 to 9 identify identical or at least corresponding features here. The gripper claw 1 having the two gripper fingers 2,2' is implemented so that the gripper fingers 2,2' are aligned essentially symmetrical to an axis (cf. dot-dash line), which extends parallel to the X axis (cf. FIG. 1) and also parallel to the first axis 4. Both gripper fingers 2,2' preferably comprise, at their lower end, two contact points 62,62' having rubber cushions 63,63' to be applied to lateral surfaces of a test tube to be received. The two rubber cushions 63,63' are preferably arranged at an angle to one another in each gripper finger 2,2' as shown.

Each holding cone 67,67' or "support cone" comprises a holding axis 40 (cf. FIGS. 7 and 9), which is aligned horizontally. Therefore, the half of the corresponding cone surface which lies above a horizontal plane defined by the holding axis 40 can be considered to be the actual support surface of the holding cone 67,67' or "support cone". In particular because of the conical shape, this support surface has no surface sections which are arranged horizontally; in other words, all parts of the support surface of a holding cone 67,67' or "support cone" according to the invention are inclined in relation to the horizontal. Therefore, it would actually be expected that the gripper fingers 2,2'—whether they are loaded or unloaded—will slip spontaneously off of these holding cones 67,67' or "support cones".

However, received gripper fingers 2,2' do not slip off of the holding cone 67,67' or support cone during the movement of the robot arm 35', which carries the unloaded parallel gripper and possibly generates vibrations, because they are held by holding means 13,13';14,14', which are implemented as permanent magnets and/or spring holding means, in their stop position 15,15'. Astoundingly, the gripper fingers 2,2' also maintain their stop position 15,15' without the aid of holding means 13,13',14,14' (such as magnets or springs):
when the parallel grippers are in the unloaded state (i.e., not holding an object between the two gripper fingers 2,2'), and when the robot arm 35' supporting the parallel gripper is in a stationary, unmoving state; or when the parallel gripper is in the loaded state (i.e., holding an object between the two gripper fingers 2,2'), and when the robot arm 35' supporting the parallel gripper is in a stationary, unmoving state; or when the parallel gripper is in the loaded state (i.e., holding an object between the two gripper fingers 2,2'), and when the robot arm 35' supporting the parallel gripper is moving, because the gripper fingers 2,2' are held by the special geometry of the respective holding cone 67,67' and the corresponding complementary depression 12,12'.

Even if the gripper fingers 2,2' are implemented as overhanging on one side (cf. FIGS. 2A, 2B, 2C, 3) they are held in their stop position 15,15' and cannot tilt around the holding axis 40, because the holding mandrels 10,10' and complementary depressions 12,12' prevent this in operational combination with stabilization means. These stabilization means or tilt guards can be implemented, as already described, as guide pins 31,31' and corresponding guide seats 32,32', as stop surfaces 17,17';19,19' of the jaw flanges 6,6' and corresponding counter surfaces 16,16';18,18', or as holding mandrels 10,10' and complementary depressions 12,12' having a cross section deviating from a circular shape.

In addition, the gripper fingers 2,2' cannot tilt around an imaginary axis which extends perpendicularly to the respective holding axis 40, because the special shape of the holding cone 67,67' or "support cone" prevents this. This shape is characterized in that the length of the two holding cones 67,67' is at least one-third of their largest diameter, and their smallest diameter is at most 90% of the largest cone diameter.

It is especially preferable for the two cone mandrels 10,10' to each comprise two cone sections following one another, which have a length ratio of 22/3 and a nominal width reduction in the ratio of 5/3 and 3/1. A cone angle α, which is 11.5°, is very especially preferred for the implementation of the holding mandrels as rotationally symmetric cone mandrels 10,10', the cone having a length of 11 mm.

| List of reference numerals | |
|---|---|
| 1 | gripper claw |
| 2, 2' | gripper finger |
| 3, 3' | gripper jaw |
| 4 | first axis |
| 5, 5' | first jaw flange |
| 6, 6' | second jaw flange |
| 7 | linear guide |
| 8 | drive |
| 9 | toothed belt |
| 9' | gear wheel |
| 10, 10' | holding mandrel |
| 11, 11' | finger base |
| 12, 12' | complementary depression |
| 13, 13' | first holding means |
| 14, 14' | second holding means |
| 15, 15' | stop position |
| 16, 16' | first counter surface |
| 17, 17' | first stop surface |
| 18, 18' | second counter surface |
| 19, 19' | second stop surface |
| 20, 20' | magnet position |
| 21, 21' | counter positions |
| 22, 22' | first spring holding means |
| 23, 23' | second spring holding means |
| 24, 24' | depression(s) |
| 25, 25' | spring-mounted body |
| 26 | mount |
| 27 | retracted position |
| 28 | link |
| 28' | variant of 28 |
| 29, 29' | contact unit |
| 30, 30' | identification unit |

-continued

| List of reference numerals | |
|---|---|
| 31, 31' | guide pin |
| 32, 32' | guide seat |
| 33, 33' | infeed cones of 31, 31' |
| 34, 34' | infeed cones of 32, 32' |
| 35 | robot |
| 35' | robot arm |
| 36 | controller |
| 37 | gearing |
| 38 | analysis unit |
| 39 | robotic laboratory facility |
| 40 | holding axis |
| 41, 41' | recess |
| 42, 42' | holding pin |
| 43, 43' | holding seat |
| 44 | solenoid brake |
| 51 | claw housing |
| 52 | rotational axis |
| 53 | gripper bolt |
| 54, 54' | gear wheel |
| 55, 55' | slide |
| 56, 56' | gripper finger (prior art) |
| 57, 57' | flank |
| 58, 58' | toothed belt |
| 59, 59' | toothed rack |
| 60, 60' | movable section |
| 61, 61' | joint |
| 62, 62' | contact points |
| 63, 63' | rubber cushion |
| 65, 65' | centering cone |
| 66, 66' | cylindrical section |
| 67, 67' | holding cone |

The invention claimed is:

1. A gripper claw (1) having replaceable gripper fingers (2,2') for grasping and depositing objects, the gripper claw (1) comprising two gripper jaws (3,3'), which each comprise a first jaw flange (5,5') parallel to a first axis (4), these two gripper jaws (3,3') being fastened using their respective first jaw flange (5,5') so they are movable on at least one linear guide (7) and being implemented as movable toward one another and away from one another in the direction of the first axis (4) along said at least one linear guide (7) by at least one drive (8), wherein each of the two gripper jaws (3,3') comprises a holding mandrel (10,10') having a holding cone (67,67') and having a holding axis (40), each of the two gripper fingers (2,2') being implemented as reversibly insertable into one of the gripper jaws (3,3') of the gripper claw (1) in each case, in that it comprises a finger base (11,11'), which has a depression (12,12') complementary to the respective corresponding holding cone (67,67') of the holding mandrel (10, 10') of the gripper claw (1), and the holding cone (67, 67') being defined in that its length is at least one-third of its largest diameter, and its smallest diameter is at most 90% of the largest cone diameter;

wherein the two gripper jaws (3, 3') and the finger bases (11, 11') of the gripper fingers (2, 2') comprise holding means (13, 13'; 14, 14') which hold the gripper fingers (2, 2') in a stop position (15, 15') on the respective gripper jaw (3, 3'), and wherein the two gripper jaws (3,3') and the finger bases (11,11') of the two gripper fingers (2,2') comprise stabilizing means, which are implemented so that, in operational combination with the holding cone (67,67'), they prevent tilting of the gripper fingers (2,2') around the holding axis (40).

2. The gripper claw (1) having gripper fingers (2,2') according to claim 1, wherein the holding mandrels (10,10') also have, in addition to the holding cone (67,67'), a centering cone (65, 65'), which precedes the holding cone (67,67') in an insertion direction into the complementary depressions (12,12') of the finger bases (11,11').

3. The gripper claw (1) having gripper fingers (2,2') according to claim 1,
wherein the holding mandrels (10,10') also comprise at least one cylindrical section (66,66').

4. The gripper claw (1) having gripper fingers (2,2') according to claim 1,
wherein the two gripper jaws (3,3') are fastened so they are movable using their respective first jaw flange (5,5') on a common linear guide (7) and are implemented as movable toward one another and away from one another mirror-symmetrically and synchronously in the direction of the first axis (4) along this common linear guide (7) by a common toothed belt (9) driven by a motor.

5. The gripper claw (1) having gripper fingers (2,2') according to claim 1,
wherein the two gripper jaws (3,3') are fastened so they are movable using their respective first jaw flange (5,5') on a common linear guide (7) and are implemented as movable toward one another and away from one another mirror-symmetrically and synchronously in the direction of the first axis (4) along this common linear guide (7) by a common gear wheel (54) driven by a motor and two toothed belts (58,58') or two toothed racks (59,59').

6. The gripper claw (1) having gripper fingers (2,2') according to claim 1,
wherein each of the two gripper jaws (3,3') comprises a second jaw flange (6,6'), which is perpendicular to the first axis (4) and is fixedly connected to one first jaw flange (5,5') in each case, the holding mandrels (10,10') being fastened on one of these two jaw flanges (6,6') in each case and being oriented toward the respective other second holding mandrel (10',10) so that their holding axis (40) is arranged parallel to the first axis (4).

7. The gripper claw (1) having gripper fingers (2,2') according to claim 6,
wherein the two holding mandrels (10,10') are aligned toward one another concentrically on a common first axis (4).

8. The gripper claw (1) having gripper fingers (2,2') according to claim 6, wherein the holding means (13,13';14,14'), for holding two gripper fingers (2,2') in a stop position (15,15') on the respective gripper jaws (3,3'), are implemented as depressions (24,24') arranged on the first jaw flanges (5,5'), and as spring-mounted bodies (25,25') arranged on correspondingly placeable positions of the two gripper fingers (2,2').

9. The gripper claw (1) having gripper fingers (2,2') according to claim 6,
wherein said holding means (13,13'), for holding two gripper fingers (2,2') in a stop position (15,15') on the respective gripper jaws (3,3'), are implemented as first magnets, which are arranged on magnet positions (20,20') of the first jaw flanges (5,5') or the second jaw flanges (6,6'), and said holding means (14,14'), for holding the two gripper fingers (2,2') in a stop position (15,15') on the respective gripper jaws (3,3'), are implemented as second magnets, which are arranged on correspondingly placeable counter positions (21,21') of the gripper fingers (2,2').

10. The gripper claw (1) having gripper fingers (2,2') according to claim 1,
wherein each of the two gripper jaws (3,3') comprises a second jaw flange (6,6'), which is parallel to the first axis (4) and is fixedly connected perpendicularly to one first jaw flange (5,5') in each case, the holding mandrels (10,10') being fastened on one of these second jaw flanges (6,6') in each case and being oriented parallel to the respective other holding mandrel (10',10) so that their holding axis (40) is arranged perpendicularly to the first axis (4) and parallel to the respective first jaw flange (5,5').

11. The gripper claw (1) having gripper fingers (2,2') according to claim 10,
wherein the holding means (13,13';14,14'), for holding two gripper fingers (2,2') in a stop position (15,15') on the respective gripper jaws (3,3'), are implemented as depressions (24,24') arranged on the first jaw flanges (5,5'), and as spring-mounter bodies (25,25') arranged on correspondingly placeable positions of the two gripper fingers (2,2').

12. The gripper claw (1) having gripper fingers (2,2') according to claim 10, wherein said holding means (13,13'), for holding two gripper fingers (2,2') in a stop position (15,15') on the respective gripper jaws (3,3'), are implemented as first magnets, which are arranged on magnet positions (20,20') of the first jaw flanges (5,5') or the second jaw flanges (6,6'), and said holding means (14,14'), for holding the two gripper fingers (2,2') in a stop position (15,15') on the respective gripper jaws (3,3'), are implemented as second magnets, which are arranged on correspondingly placeable counter positions (21,21') of the gripper fingers (2,2').

13. The gripper claw (1) having gripper fingers (2,2') according to claim 1,
wherein the first jaw flanges (5,5') or the second jaw flanges (6,6') comprise guide pins (31,31'), which are aligned parallel to the holding mandrels (10,10') and are arranged at a distance to these holding mandrels (10,10'), the finger bases (11,11') of the gripper fingers (2,2') comprising guide seats (32,32'), which are implemented to hold the guide pins (31,31') in the stop position (15,15') of the gripper fingers (2,2'), and the guide pins (31,31') and guide seats (32,32') being implemented as stabilizing means and, in operational combination with the holding mandrels (10,10') and complementary depressions (12,12'), preventing tilting of the gripper fingers (2,2') received using the gripper jaws (3,3').

14. The gripper claw (1) having gripper fingers (2,2') according to claim 13, wherein the holding means (13,13',14,14') for holding two gripper fingers (2,2') in a stop position (15,15') on respective gripper jaws (3,3') are implemented as depressions (24,24') in the first jaw flanges (5,5') or in the second jaw flanges (6,6'), and spring-mounted bodies (25,25') are mounted in a recess (41,41') in the respective finger base (11,11').

15. The gripper claw (1) having gripper fingers (2,2') according to claim 1,
wherein the finger bases (11,11') of the gripper fingers (2,2') comprise counter surfaces (16,16';18,18'), which are applied to stop surfaces (17,17';19,19') of the jaw flanges (6,6') in the stop position (15,15') of the gripper fingers (2,2') and are implemented as stabilizing means and, in operational combination with the holding mandrels (10,10'), prevent tilting of the gripper fingers (2,2') inserted in the gripper claw (1).

16. The gripper claw (1) having gripper fingers (2,2') according to claim 15, wherein the holding means (13,13',14,14') for holding two gripper fingers (2,2') in a stop position (15,15') on respective gripper jaws (3,3') are implemented as depressions (24,24') in second stop surfaces (19,19') of the first jaw flanges (5,5') or second jaw flanges (6,6'), and spring-mounted bodies (25,25') are mounted in a recess (41,41') in the respective second counter surface (18,18').

17. The gripper claw (1) having gripper fingers (2,2') according to claim 1,
wherein the holding mandrels (10,10') of the gripper claw (1) and the complementary depressions (12,12') of each finger base (11,11') are implemented as stabilizing means and have a corresponding cross section deviating from a circular shape, whereby tilting of the gripper fingers (2,2') inserted into the gripper claw (1) is prevented in their stop position (15, 15').

18. The gripper claw (1) having gripper fingers (2,2') according to claim 17, wherein the holding means (13,13';14,14') for holding two gripper fingers (2,2') in a stop position (15,15') on respective gripper jaws (3,3') are implemented as depressions (24,24') in the first jaw flanges (5,5') or in the second jaw flanges (6,6'), and spring-mounted bodies (25,25') are mounted in a recess (41,41') in the respective finger base (11,11').

19. The robot (35) according to claim 17,
wherein each of the gripper jaws (3,3') of the gripper claw (1) comprises a contact unit (29,29'), which is operationally linked to an analysis unit (38) of the controller (36) of the robot (35), and each gripper finger (2,2') insertable into the gripper claw (1) comprises an identification unit (30,30'), which is in a read contact with the contact unit (29,29') in the stop position (15,15') of the gripper finger (2,2'), so that each gripper finger (2,2') is identifiable using the analysis unit (38) of the robot (35).

20. The gripper claw (1) having gripper fingers (2,2') according to claim 1,
wherein the two holding mandrels (10,10') are implemented as conical, and have a circular cross section and a ratio of the largest cone diameter to the cone length which is less than 1:3 and is particularly preferably 1:5.

21. A robot (35) having a gripper claw (1) and gripper finger (2,2') combination according to claim 1, the robot (35) comprising a controller (36).

22. A method for receiving two gripper fingers (2,2') using a gripper claw (1) and gripper finger (2,2') combination according to claim 1,
wherein this method comprises the following steps:
(a) providing two gripper fingers (2,2') with a mount (26), these gripper fingers (2,2') being aligned to one another and presented to the gripper claw (1) so that the gripper jaws (3,3') can be moved into a retracted position (27) using the gripper claw (1);
(b) moving the gripper jaws (3,3') of the gripper claw (1) into the retracted position (27), in which the holding mandrels (10,10') of the gripper claw (1) are directly opposite to the complementary depressions (12,12') of the finger bases (11,11') of the two gripper fingers (2,2');
(c) engaging the holding mandrels (10,10') of the gripper claw (1) in the complementary depressions (12,12') of the finger bases (11,11') of the two gripper fingers (2,2') until the gripper fingers (2,2') reach their stop position (15,15') on the respective gripper jaws (3,3'); and
(d) moving the gripper fingers (2,2') received using the gripper claw (1) out of the mount (26).

23. The method according to claim 22,
wherein the engagement of the holding mandrels (10,10') in step (c) is caused by a horizontal contraction of the two gripper jaws (3,3') in the direction of the first axis (4).

24. The method according to claim 22,
wherein the engagement of the holding mandrels (10,10') in step (c) is caused by a horizontal forward movement of the two gripper jaws (3,3') in a direction perpendicular to the first axis (4).

25. The method according to claim 22,
wherein the two gripper fingers (2,2') of a gripper claw (1) of a robotic laboratory facility (39) are replaced by a robot.

26. A method for releasing two gripper fingers (2,2') using a gripper claw (1) and gripper finger (2,2') combination according to claim 1,
wherein this method comprises the following steps:
(a) lowering the two gripper fingers (2,2') received using the gripper claw (1) toward a mount (26) having a link (28) and moving the gripper claw (1) until the gripper fingers (2,2') of the gripper claw (1) assume an end position; and
(b) moving the holding mandrels (10,10') of the gripper claw (1) out of the complementary depressions (12,12') of the finger bases (11,11') of the two gripper fingers (2,2') until the holding mandrels (10,10') of the gripper claws (1) exit from the complementary depressions (12, 12') of the finger bases (11,11') of the two gripper fingers (2,2').

27. The method according to claim 26,
wherein the movement of the gripper claw (1) in step (a) is performed until holding pins (42,42') of the link (28) engage in corresponding holding seats (43,43') of the finger bases (11,11').

28. The method according to claim 26,
wherein moving out of the holding mandrels (10,10') in step (b) is caused by horizontally moving the two gripper jaws (3,3') away from one another in the direction of the first axis (4).

29. The method according to claim 26,
wherein moving out of the holding mandrels (10,10') in step (b) is caused by a horizontal reverse movement of the two gripper jaws (3,3') in a direction perpendicular to the first axis (4).

\* \* \* \* \*